(12) United States Patent
Hampton et al.

(10) Patent No.: US 7,221,454 B2
(45) Date of Patent: May 22, 2007

(54) PHOTOPOLARIMETERS AND SPECTROPHOTOPOLARIMATERS WITH MULTIPLE DIFFRACTION GRATINGS

(75) Inventors: D. Scott Hampton, Mundelein, IL (US); Shankar Krishnan, Santa Clara, CA (US); James Rix, Chicago, IL (US)

(73) Assignee: Containerless Research, Inc., Evanston, IL (US)

( * ) Notice: Subject to any disclaimer, the term of this patent is extended or adjusted under 35 U.S.C. 154(b) by 454 days.

(21) Appl. No.: 10/504,796

(22) PCT Filed: Feb. 13, 2003

(86) PCT No.: PCT/US03/04794

§ 371 (c)(1),
(2), (4) Date: Aug. 13, 2004

(87) PCT Pub. No.: WO03/069291

PCT Pub. Date: Aug. 21, 2003

(65) Prior Publication Data

US 2005/0018189 A1    Jan. 27, 2005

Related U.S. Application Data

(60) Provisional application No. 60/356,910, filed on Feb. 14, 2002.

(51) Int. Cl.
*G01J 4/00* (2006.01)
(52) U.S. Cl. ............... 356/364; 356/327; 356/328; 356/366
(58) Field of Classification Search ........ 356/364–369, 356/327, 328; 385/11, 37
See application file for complete search history.

(56) References Cited

U.S. PATENT DOCUMENTS

| | | | |
|---|---|---|---|
| 5,337,146 A | 8/1994 | Azzam | |
| 5,805,285 A | 9/1998 | Johs et al. | |
| 6,211,957 B1 * | 4/2001 | Erdogan et al. | ............ 356/364 |
| 6,384,916 B1 | 5/2002 | Furtak | |
| 6,490,043 B1 | 12/2002 | Kebabian | |

* cited by examiner

*Primary Examiner*—Layla G. Lauchman
(74) *Attorney, Agent, or Firm*—Clausen Miller, PC

(57) ABSTRACT

In a device for measuring the complete polarization state of light over a spectral bandwidth, an optical input signal (41) with wavelengths of light within a spectral band is incident on two or more diffraction gratings (42, 44, 46, 48), or incident from at least two directions on one or more diffraction gratings (72, 74), and the intensity is measured as a function of wavelength for at least four of the diffraction spectra produced by the grating(s). The polarization state of light is then calculated as a function of wavelength over the spectral bandwidth from the intensity measurements.

18 Claims, 2 Drawing Sheets

PHOTOPOLARIMETERS AND SPECTROPHOTOPOLARIMATERS WITH MULTIPLE DIFFRACTION GRATINGS

This application claims the benefit of U.S. Provisional Application No. 60/356,910, filed Feb. 14, 2002.

GOVERNMENT LICENSE RIGHTS

This invention was made with Federal Government support under Contract Nos. DMI-9660014 and DMI-9801032 awarded by the National Science Foundation, and with State Government support under contract No. 01-49110 awarded by the State of Illinois, Department of Commerce and Community Services. The U.S. Government has certain rights in this invention.

BACKGROUND

1. Field of the Invention

The present invention relates to photopolarimeters, particularly spectrophotopolarimeters. Specifically, the present invention relates to photopolarimeters that use diffraction at more than one grating or multiple diffraction at the same grating to measure all four Stokes parameters of arbitrarily polarized light over a range of wavelengths of light.

2. Description of the Prior Art

The spectral characteristics of grating diffraction are well known and widely exploited in spectroscopy. Light incident on a grating is dispersed into a spectrum, enabling spectroscopy with a slit and grating rotating mechanism, or with a stationary grating and an array detector that intercepts the diffracted light. The spectrum is usually measured using fan-out of only one diffracted order, typically the $-1$ diffracted order.

The polarization characteristics of grating diffraction are less well known and exploited. In general, each of the orders of diffraction contains different information about the polarization state of the light incident on the grating. By simultaneously measuring the spectra of four or more orders of diffraction, a grating spectrometer can be designed to yield the complete polarization state for the entire spectrum of light.

Azzam U.S. Pat. No. 5,337,146, issued Aug. 9, 1994 and incorporated herein by reference, discloses a division-of-amplitude photopolarimeter (DOAP) based on conical grating diffraction or planar grating diffraction. The Azzam instrument comprises a diffraction grating selected to produce at least four orders of diffraction; a source of an incident light beam whose state of polarization is to be measured, the source oriented such that it directs the light beam to the diffraction grating; at least four photodetectors, each of which intercepts a different diffracted order of the light beam diffracted from the grating; and calculating means responsive to the photodetectors for determining the four Stokes parameters descriptive of the polarization state of the light beam.

If the grating is used in the planar diffraction configuration, the instrument further comprises polarizers that are inserted in the path of at least two of the diffracted beams. One of the diffracted orders of the light may be directed to an alignment detector used to properly align the instrument.

The Azzam patent discloses that instruments that employ planar diffraction have certain advantages over instruments that employ conical diffraction. For example, planar diffraction allows a more compact instrument geometry because all diffracted beams and the detectors can be disposed in one plane.

There are several novel features of the Azzam instrument, generally referred to as a grating-division-of-amplitude photopolarimeter, or G-DOAP, that provide utility in applications. For example, the Azzam G-DOAP delivers a fraction of the entire beam of incident light to each of the detectors used in the instrument. Thus the Azzam instrument differs in principle from a division-of-wavefront photopolarimeter (DOWP) that delivers different portions of the beam of incident light to different detectors. As a result, the Azzam division-of-amplitude instrument is inherently insensitive to transverse spatial variations of the light intensity in the beam that produce errors of measurement in a division-of-wavefront instrument.

The G-DOAP is a complete photopolarimeter, i.e., it determines the signs and values of all four components of the Stokes parameters (conventionally designated $S_0, S_1, S_2, S_3$) that describe the polarization state of the incident light. As such, it provides more information than is obtained by a conventional rotating analyzer photopolarimeter. Also unlike a rotating analyzer device, the Azzam instrument distinguishes right and left circular or elliptically polarized light, distinguishes circular polarized states of light from depolarized light, and measures the sign of the third Stokes parameter, $S_3$.

A further novel aspect of the Azzam instrument is that, since there are no moving parts, all intensity measurements can be obtained simultaneously. Thus the measurement rates are not limited by the time required to perform mechanical adjustments.

An example described in the Azzam patent applied the instrument to measure the polarization state of light at a single wavelength equal to 633 nm. Intensity measurements obtained for zero, $-1$, $-2$, and $-3$ orders of diffraction were used for polarimetric analysis and the $-4$ order of diffraction was used for alignment.

Unlike this example in Azzam, use of the present invention as a spectroscopic polarimeter for measurements over a range of wavelengths requires that all intensity measurements used for polarimetric analysis be obtained on non-zero orders of diffraction.

To provide a spectroscopic polarimeter based on the Azzam invention, which is the object of the present invention, it is desired that the instrument have a wide spectral bandwidth, high sensitivity for operation with relatively small light intensities, simplicity of construction, and the ability to be readily modified to operate over different spectral ranges that are of interest in applications.

In designing such an instrument, there are several practical issues that must be addressed. A first practical issue in the design of a spectroscopic polarimeter is that light of different wavelengths that is diffracted in different orders will tend to be focused to the same position on the detectors of the instrument, since the angles of diffraction will be equal if the products of wavelength and order number are equal. Four orders of diffraction must be measured. Thus, for example, a polarimeter that applies measurements in orders $-1, -2, -3$, and $-4$ will be limited to wavelengths no more than 1.2 times the minimum wavelength of light received due to interference of light diffracted in the $-5^{th}$ order with the $-4^{th}$ order spectrum.

To overcome this problem, spectral blocking filters may be placed to intercept the path of diffracted beams and expand the wavelength range at which the diffraction intensities can be detected without interference from higher-order spectra. It is also possible, but not necessarily desirable in view of other design issues, to adjust the angle of incidence of the light beam on the grating so that both positive and negative diffraction orders can be observed, allowing measurements to be obtained without order overlap and in an increased spectral range, for example, in diffraction orders +2, +1, −1, and −2.

A second practical issue is that the sensitivity of the instrument is limited by the tendency of the diffraction efficiency to be smaller for higher-order diffraction. Thus, instruments designed to detect higher-order diffraction spectra will tend to exhibit smaller sensitivity and require more intense light sources.

A third practical issue is that, as disclosed by Azzam, in the planar diffraction configuration, polarizers must be inserted in the path of at least two of the diffracted beams. Otherwise, the instrument cannot function as a complete polarimeter. While it is not necessary to insert polarizers in the paths of diffracted beams for the conical diffraction instrument, the sensitivity of both the planar and conical diffraction instruments to the polarization state of the light can be increased by inserting such polarizers into the paths of the diffracted beams. In practice, inexpensive sheet polarizers may be used for this purpose, but the sheet polarizers are effective over a limited wavelength range and may not provide sufficient sensitivity of the instrument to the polarization state of light over the full spectral range for which measurements are possible.

A fourth practical issue is that inexpensive polarizers and spectral blocking filters may not be available in the wavelength range of interest. This can occur in the vacuum ultraviolet spectral range, where few materials are available that transmit light.

Thus a primary object of the present invention is to provide a spectroscopic photopolarimeter that applies diffraction at multiple gratings or multiple diffraction events at a single grating.

Another object of the invention is to provide an instrument that can use a relatively large oblique angle of incidence at the grating(s) to increase the sensitivity of the instrument to the polarization state of light.

Another object of the invention is to provide a photopolarimeter that achieves a relatively equal range of light intensities at each of the array detectors at which intensities are measured.

Still another object of the present invention is to provide a photopolarimeter with multiple gratings that are oriented to achieve increased sensitivity to the polarization state of light and allow measurement of the complete state of polarization of light without any polarizers inserted into the paths of diffracted beams.

SUMMARY

The present invention is a photopolarimeter that applies diffraction at multiple gratings, or multiple diffraction events at one or more gratings. The novel design enhances a designer's ability to increase the wavelength range of the instrument without using order-blocking filters. It allows the designer to eliminate the use of polarizers placed into the path of diffracted beams, if desired, and to optimize the performance of the instrument as a detector of the polarization state of light by adjusting the orientations of multiple gratings.

In one embodiment illustrated in FIG. 3, the photopolarimeter comprises a source for producing an incident light beam, at least four metallic reflection diffraction gratings, each of which produce zero and first order diffracted beams, an array of photodetectors positioned to intercept at least four of the first order diffracted beams, and means responsive to the photodetectors for calculating the polarization state of the incident light beam over the wavelength range of the light. The gratings are positioned such that the first grating intercepts the incident light beam and subsequent gratings intercept the zero order beam from a previous grating. If the gratings are in the planar diffraction configuration, they are positioned such that the plane of incidence (defined by the incident light beam and a line normal to the grating surface at the point of incidence of the light beam on the grating) and/or the angle of incidence differ between the several gratings. No polarizers or spectral blocking filters are placed in the light paths of the first order diffraction beams detected by the instrument. The incident light beam has a bandwidth ranging from a minimum wavelength to a maximum wavelength of approximately two times the minimum wavelength.

Alternatively, the incident light beam can have a bandwidth ranging from a minimum wavelength to a maximum wavelength of approximately four times the minimum wavelength, and the instrument further comprises spectral filters that block transmission of light with a wavelength between the minimum wavelength and 2 times the minimum wavelength. The filters are located in the light paths that transmit the first order diffraction spectra that lie in the wavelength range from 2 times to 4 times the minimum wavelength.

In another embodiment illustrated in FIG. 1, the instrument comprises a source for producing an incident light beam, two or more metallic reflection diffraction gratings, photodetector arrays positioned to intercept the diffracted beams from the gratings, and means responsive to the photodetector arrays for calculating the polarization state of the incident light beam over the wavelength range of the light.

The gratings have a spatial frequency selected to produce zero, first and second order diffracted beams and are positioned such that the first grating intercepts the incident light beam and subsequent gratings intercept the zero order from a previous grating. A total of at least four first and second orders of diffraction produced at the gratings are transmitted to the photodetectors.

If the gratings are in the planar diffraction configuration, they are positioned such that the plane of incidence and/or the angle of incidence differ between the several gratings. The incident light beam has a bandwidth ranging from a minimum wavelength to a maximum wavelength of approximately 1.5 times the minimum wavelength.

Where the incident light beam has a bandwidth ranging from a minimum wavelength to a maximum wavelength of approximately two times the minimum wavelength, the instrument further comprises spectral filters that block transmission of light with a wavelength between the minimum wavelength and 1.5 times the minimum wavelength. The filters are located in the light paths that transmit the second order diffraction spectra that lie in the wavelength range from 1.5 times to 2 times the minimum wavelength.

In another embodiment illustrated in FIG. 4, the instrument comprises a source for producing an incident light beam, two or more metallic reflection diffraction gratings, a reflector, photodetector arrays positioned to intercept the diffracted beams from the gratings, and means responsive to the photodetector arrays for calculating the polarization state of the incident light beam over the wavelength range of the light.

The gratings have a spatial frequency selected to produce zero and first order diffracted beams and are positioned such that the first grating intercepts the incident light beam and subsequent gratings intercept the zero order beam from a previous grating. The reflector returns the zero-order diffracted beam from the last grating to be incident on the sequence of gratings from the opposite direction to produce additional zero and first orders of diffraction from the gratings. A total of at least four first orders of diffraction produced at the gratings are transmitted to the photodetectors.

If the gratings are in the planar diffraction configuration, they are positioned such that the plane of incidence and/or the angle of incidence differ between the several gratings. The incident light beam has a bandwidth ranging from a minimum wavelength to a maximum wavelength of approximately 2 times the minimum wavelength.

Where the incident light beam has a bandwidth ranging from a minimum wavelength to a maximum wavelength of approximately four times the minimum wavelength, the instrument further comprises spectral filters that block transmission of light with a wavelength between the minimum wavelength and 2 times the minimum wavelength. The filters are located in the light paths that transmit the first order diffraction spectra that lie in the wavelength range from 2 times to 4 times the minimum wavelength.

In yet another embodiment illustrated in FIG. 2, the instrument comprises a source for producing an incident light beam, one metallic reflection diffraction grating, a reflector, photodetector arrays positioned to intercept the diffracted beams from the gratings, and means responsive to the photodetector arrays for calculating the polarization state of the incident light beam over the wavelength range of the light.

The grating has a spatial frequency selected to produce zero, first and second order diffracted beams. The reflector returns the zero-order diffracted beam to be incident on the grating from the opposite direction to produce additional zero, first, and second orders of diffraction from the grating. A total of four first and second orders of diffraction produced by the grating are transmitted to the photodetectors.

If the grating is in the planar diffraction configuration, polarizers are inserted in the path of at least two of the diffracted beams that are transmitted to the detectors.

Alternatively, the reflector is designed so that the incidence angle of the beam returned to the grating differs from that of the beam initially incident on the grating and polarizers are inserted in the path of at least one of the diffracted beams that are transmitted to the detectors. The incident light beam has a bandwidth ranging from a minimum wavelength to a maximum wavelength of approximately 1.5 times the minimum wavelength.

Where the incident light beam has a bandwidth ranging from a minimum wavelength to a maximum wavelength of approximately two times the minimum wavelength, the instrument further comprises spectral filters that block transmission of light whose wavelength is between the minimum wavelength and 1.5 times the minimum wavelength. The filters are located in the light paths that transmit second order diffraction spectra that lie in the wavelength range from 1.5 times to 2 times the minimum wavelength.

DRAWINGS

DETAILED DESCRIPTION OF THE INVENTION

Figure 1:
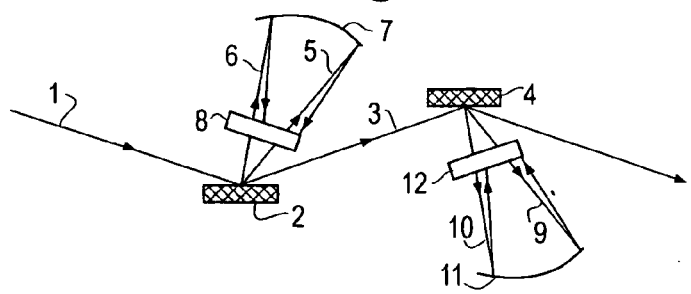
FIG. 1 is a diagram of a photopolarimeter according to the present invention, showing diffraction at two successive gratings with detection of the first and second order diffraction spectra from each grating.

Turning to the drawings, there is shown in FIG. 1 a diagram of a first grating-division-of-amplitude photopolarimeter (G-DOAP) according to the invention, showing diffraction at two successive gratings with detection of the first and second order diffraction spectra from each grating. A collimated incident light beam 1 is directed at a diffraction grating 2. The zero-order diffracted beam 3 is directed at second diffraction grating 4. The first and second order diffraction spectra 5 and 6 from diffraction grating 2 are focused by lens 7 to array detector 8 where the spectral intensities are measured as a function of wavelength. The first and second order diffraction spectra 9 and 10 from diffraction grating 4 are focused by lens 11 to array detector 12 where the spectral intensities are measured as a function of wavelength.

Figure 2:
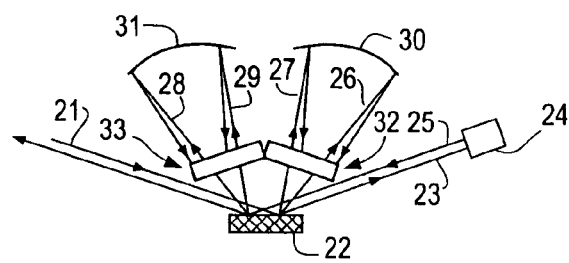
FIG. 2 is a diagram of a second photopolarimeter according to the present invention, showing diffraction of the incident beam at a grating with reflection of the zero order beam and diffraction a second time at the same grating with detection of the first and second order diffraction spectra.

FIG. 2 is a diagram of a second photopolarimeter according to the invention, showing diffraction of an incident beam and a reflected beam at the same grating. A collimated light beam 21 is directed at a diffraction grating 22. The zero-order diffracted beam 23 is directed to a reflector 24 that redirects the beam onto diffraction grating 22 via light path 25. The first and second order diffraction spectra 26 and 27 from the first beam 21 incident on diffraction grating 22 and the first and second order diffraction spectra 28 and 29 from the second beam 25 incident on diffraction grating 22 are directed to lenses 30 and 31 respectively and focused to array detectors 32 and 33 where the spectral intensities are measured as a function of wavelength.

In using the devices illustrated in FIGS. 1 and 2, the incident light beam may have a bandwidth ranging from a minimum wavelength of $\lambda$ (lambda) to a maximum wavelength of approximately 1.5 times $\lambda$. Polarizers may be placed in the light paths between the gratings and the array detectors to influence the accuracy with which the polarization state of the light can be calculated from the four spectral intensities that are measured as a function of wavelength. In this configuration, higher-order spectra will not interfere with measurements of the first-order and second-order spectral intensities over the 1.5-fold range of wavelengths in the bandwidth of the light detected by the instrument.

Alternatively, the incident light beam may have a bandwidth ranging from a minimum wavelength of $\lambda$ to a maximum wavelength of approximately 2 times $\lambda$. Spectral filters that block transmission of light with wavelengths between λ and 1.5 times λ are placed in the light paths that transmit the second order diffraction spectra that lie in the wavelength range from 1.5 times λ to 2.0 times λ. In this configuration, higher order spectra will not interfere with measurements of the first-order and second-order spectral intensities over the 2-fold range of wavelengths in the bandwidth of the light detected by the instrument.

Figure 3:
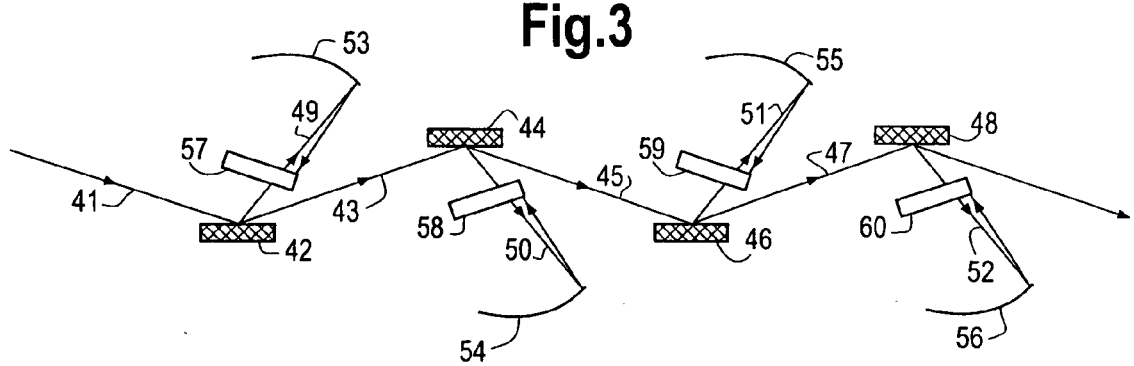
FIG. 3 is a diagram of a third photopolarimeter according to the present invention, showing diffraction at four successive gratings with detection of the first order diffraction spectra from each grating.

FIG. 3 is a diagram of a third photopolarimeter according to the invention, showing diffraction at four successive gratings with detection of the first order diffraction spectra from each grating. A collimated light beam 41 is directed at a diffraction grating 42. The zero-order diffracted beam 43 is directed to a second diffraction grating 44. The zero-order diffracted beam 45 is directed to a third diffraction grating 46. The zero-order diffracted beam 47 is directed to a fourth diffraction grating 48. The first order diffracted beams 49, 50, 51 and 52 from diffraction gratings 42, 44, 46 and 48 are directed to lenses 53, 54, 55 and 56 which focus the spectra to array detectors 57, 58, 59 and 60 where the spectral intensities are measured as a function of wavelength.

Figure 4:
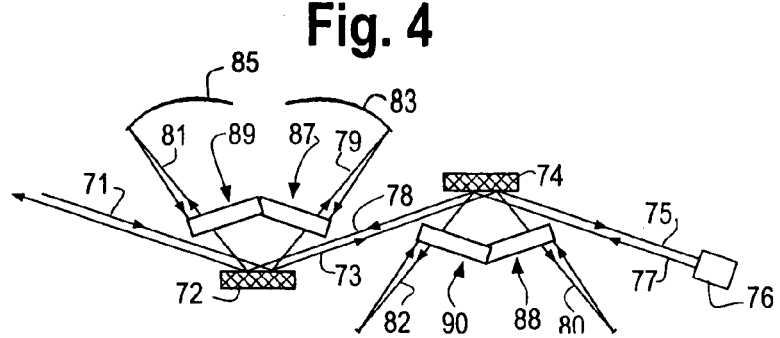
FIG. 4 is a diagram of a fourth photopolarimeter according to the present invention, showing diffraction at two successive gratings with reflection and diffraction a second time at the two gratings with detection of the first order diffraction spectra.

FIG. 4 is a diagram of a fourth photopolarimeter according to the invention, showing diffraction at two successive gratings with reflection and diffraction a second time at the two gratings. A collimated light beam 71 is directed at a diffraction grating 72. The zero-order diffracted beam 73 is directed to a second diffraction grating 74. The zero-order diffracted beam 75 is directed to reflector 76, which redirects the beam onto diffraction grating 74 via light path 77. The zero-order diffracted beam 78 of the reflected beam 77 at diffraction grating 74 is directed to diffraction grating 72. The first order diffracted beams 79 and 80 from the light initially incident on the diffraction gratings and the first order diffracted beams 81 and 82 from the light reflected onto the diffraction gratings are directed by lenses 83, 84, 85 and 86 onto array detectors 87, 88, 89 and 90, where the spectral intensities are measured as a function of wavelength.

In using the devices illustrated in FIGS. 3 and 4, the incident light beam may have a bandwidth ranging from a minimum wavelength of λ (lambda) to a maximum wavelength of approximately 2 times λ. Polarizers may be placed in the light paths between the gratings and the array detectors to influence the accuracy with which the polarization state of the light can be calculated from the four spectral intensities that are measured as a function of wavelength. In this configuration, higher-order spectra will not interfere with measurements of the first-order spectral intensities over the 2-fold range of wavelengths in the bandwidth of the light detected by the instrument.

Alternatively, the incident light beam may have a bandwidth ranging from a minimum wavelength of λ to a maximum wavelength of approximately 4 times λ. Spectral filters that block transmission of light with wavelengths between λ and 2 times λ are placed in the light paths that transmit the first-order diffraction spectra that lie in the wavelength range from 2 times λ to 4 times λ. In this configuration, higher order spectra will not interfere with measurements of the first-order spectral intensities over the 4-fold range of wavelengths in the bandwidth of the light detected by the instrument.

Calibration

The polarization state of light at each wavelength is characterized by the Stokes vector $S=[S_0\ S_1\ S_2\ S_3]^t$, where t indicates the transpose. The response of the G-DOAP is given by four voltages (intensities), $I=[I_0\ I_1\ I_2\ I_3]^t$, measured by the four detectors on four non-zero orders of diffraction for each wavelength in the waveband. At each wavelength, the intensities from the four orders yield the intensity vector I, which is related to the input Stokes vector, S, through the instrument matrix F:

$$I=FS$$

F is a 4×4 real matrix that is characteristic of the instrument. If F is known, S can be calculated from I using the inverse relationship:

$$S=F^{-1}I$$

Methods for calibrating the G-DOAP are described in the literature. The calibration matrix, F, is determined by placing the G-DOAP in a straight-through arrangement and illuminating it with a series of linear and circular polarization states. Once F is known as a function of wavelength, the G-DOAP can be used as an analyzer in a spectroscopic ellipsometer. In this application, polarized light with known initial state of polarization is reflected or transmitted by a material of interest and the G-DOAP is used to measure the Stokes parameters, as a function of wavelength, of the light that is reflected or transmitted by the material. The measured Stokes parameters are related to the ellipsometric parameters through simple trigonometric functions that depend on the choice of the initial polarization state.

The magnitude of the determinant of the calibration matrix is a measure of the sensitivity of the G-DOAP instrument to the polarization state of light. In practice, it is instructive to calculate the determinant of the normalized calibration matrix, in which the elements of each row of the matrix are normalized by the value in the first column of that row. Such a matrix, where the first column is unity, simply describes an instrument where each of its four detection channels has the same sensitivity to unpolarized light. This is possible, but not required in practice, by applying different electronic gains to each channel.

The maximum possible value for the determinant magnitude of the normalized instrument matrix for a G-DOAP polarimeter is 3.08. Our experience shows that instruments are very good polarimeters when the determinant of the normalized calibration matrix is approximately 1.0 or greater. Polarimeters with smaller determinant magnitudes require greater stability in electronics, and greater precision in the intensity measurements.

EXAMPLE

A spectroscopic division-of-amplitude photopolarimeter according to the design shown in FIG. 2 was constructed and operated to measure all four Stokes parameters of arbitrarily polarized light over the 550–940 nm wavelength range in real time.

The (collimated) incoming beam was incident on an Al-coated, asymmetric saw-tooth (3.6 degrees blaze angle), 150 groove/mm, diffraction grating at an incidence angle of 68 degrees. A planar diffraction geometry was used and all diffracted orders were in a common vertical plane. Under these conditions, only the zero and negative diffraction orders propagate. The first two negative diffraction orders (−1 and −2) were focused by a spherical mirror onto a first detector array. The zero-order beam was reflected back onto the grating and two additional −1 and −2 diffraction orders were directed onto a second detector array. The spherical mirrors were tilted to focus the light onto detector arrays located outside the plane of incidence on the grating. About 10% of the light striking the reflector was transmitted and focused onto a CCD camera. The image from the CCD camera and the entrance aperture of the G-DOAP allowed precise matching of alignment during calibration and measurements. Dichroic sheet polarizers of specific orientations were placed directly over the detectors in the different orders. A birefringent retarder sheet (140 nm of retardance) was also placed over the detector for diffraction order 2 of the beam initially incident on the grating.

The detector arrays were Hamamatsu 1024-element, 25-micrometer wide, 2.5-mm high NMOS self-scanning photodiode linear detector arrays. There was an approximate 80 pixel gap between the first and second order to facilitate placement of the polarizers. The gap arose from the fact that the spectral range of light entering the G-DOAP was between 550 and 940 nm, and the second diffracted order at 550 nm began 80 pixels after the first diffracted order at 940 nm. The spherical mirror supports had adjustments to locate the spectra on the arrays by using a reference narrow-band interference filter in the beam path and adjusting the mirrors so that the spectral line was centered at the design pixel locations.

With a minimum design wavelength of 550 nm, the second-order diffraction spectrum at $\lambda=825$ nm began to overlap with the third-order diffraction beginning at 550 nm. A blocking filter designed to block the shorter wavelength third-order light was placed in the light path of second order diffraction at wavelengths greater than approximately 800 nm.

A digital signal processor (DSP)-based platform, designed and fabricated by Indus Instruments of Houston, Tex., was used to perform array timing, data acquisition and data transfer.

Figure 5:
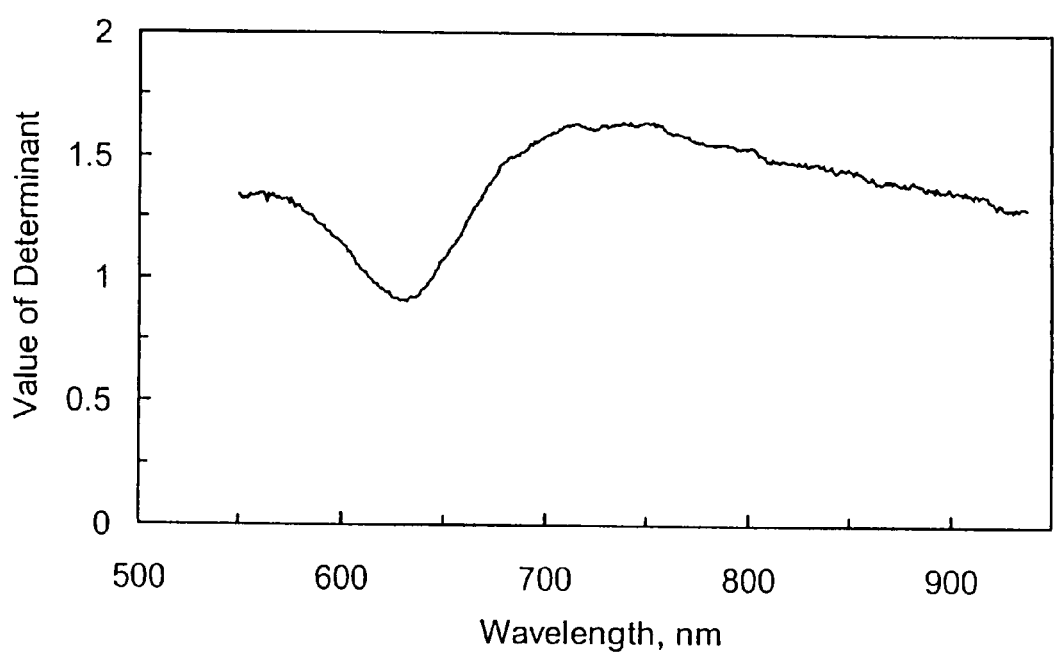
FIG. 5 is a diagram illustrating the values for the determinant of the normalized calibration matrix over the wavelength range from 550 to 940 nm that were determined for a polarimeter made according to the invention.

FIG. 5 illustrates the values for the determinant of the normalized calibration matrix that were determined for this polarimeter over the wavelength range from 550 to 940 nm. This result shows that the spectroscopic polarimeter has good sensitivity to the polarization state of light over the entire wavelength range.

Grating Design

Although the embodiments described in this disclosure indicate metallic reflection diffraction gratings, it should be evident to those of ordinary skill in the art that the invention is equally workable with transmission gratings. The metallic reflection gratings comprise a plurality of parallel grooves. They may be ruled gratings, with blaze angles that tend to maximize the diffraction efficiency in a particular order and range of wavelengths or holographic gratings. The gratings may comprise other periodic transmissive or reflective structures that diffract light. The gratings may be placed in the planar diffraction configuration, with the plurality of parallel grooves perpendicular to the plane of incidence, or in the conical diffraction configuration, such that the grooves are not parallel to the plane of incidence. Each successive grating may be oriented such that the gratings do not have a common plane of incidence.

Prior to the present invention, G-DOAP was not applied to polarization measurements over a continuum of wavelengths. When a collimated broad-band light beam strikes a grating, it is diffracted into multiple orders and is dispersed within each order. The diffraction efficiency depends on the order number and is a function of wavelength within a given order, and these differences are readily absorbed into the instrument calibration.

The angular characteristics of planar grating diffraction are described by Equation (1), where $\theta_i$ is the angle of diffraction of the i-th order, $\theta$ is the angle of incidence (all angles are measured from the grating normal), $\lambda$ is the wavelength of the incident light, and g is the grating period, which is equal to the inverse of the grating spatial frequency.

$$\sin(\theta_i) = \sin(\theta) + i(\lambda/g) \qquad (1)$$

It can be seen from this equation that the diffraction angle will be the same for different orders of diffraction for equal values of the quantity $i(\lambda/g)$. Thus, for example, if the bandwidth of the light begins at a certain minimum wavelength, $\lambda_{min}$, light at and above this wavelength will be diffracted at the same angular range in second order as light of wavelength equal or greater than 2 $\lambda_{min}$ that is diffracted in first order. Similarly, light having a wavelength of $\lambda_{min}$ or greater diffracted in third order will occur at the same angle as light diffracted in second order for wavelengths of 1.5 $\lambda_{min}$ or greater.

It is also seen from the above equation that zero-order diffraction occurs at the same angle for all wavelengths. The zero-order diffraction thus comprises a beam of light that can be transmitted to another grating or reflected back onto the grating to produce additional diffraction spectra.

If, as in FIGS. 3 and 4, a sequence of gratings is used in the instrument to produce at least four first order diffraction spectra that are directed to array detectors that measure the diffraction intensities as a function of wavelength, then the bandwidth of the light beam detected by the instrument may be restricted to a wavelength range from a minimum wavelength, $\lambda_{min}$, to 2 $\lambda_{min}$. Then light diffracted at orders greater than first order will not interfere with measurements of the intensities of the first order diffraction spectra.

The bandwidth of the instrument can be increased by placing order-blocking filters on the detectors in the region where the first-order and higher order spectra overlap. For example, order blocking filters may be selected that block transmission of light in the region from $\lambda_{min}$ to 2 $\lambda_{min}$ and transmit light of wavelength greater than 2 $\lambda_{min}$. In this way, the first order spectra can be extended up to a wavelength of 4 $\lambda_{min}$.

Similar considerations apply to instruments that detect the first and second orders of diffraction, as in FIGS. 1 and 2. In these cases, the bandwidth of the instrument must be restricted to a range of wavelengths from $\lambda_{min}$ to 1.5 $\lambda_{min}$, or order blocking filters must be used that begin at 1.5 $\lambda_{min}$, where second and third-order spectra begin to overlap.

If order blocking filters are placed in the instrument to intercept the light directed to the photodetector arrays, then simultaneous measurements of the four or more spectra over the entire bandwidth enabled by the order blocking filters is possible. If order blocking filters are placed in the light source to limit the range of wavelengths received by the instrument, then a sequence of measurements over different wavelength ranges becomes possible.

The gratings may be constructed to control the fraction of the incident intensity that is diffracted into a particular order of diffraction, by using a blaze angle in the gratings such that the diffraction efficiency is increased for a particular order of diffraction. The blaze angle of the gratings may also be chosen to distribute the light in the spectrum between the detectors in a manner that tends to accommodate the variation of intensity with wavelength that occurs in the incident light beam.

The gratings used in the instrument may be planar, i.e., flat, or they may have curved surfaces. If the gratings are planar, separate focusing elements are used to collect the light diffracted by the gratings and focus the light onto photodetector arrays. The photodetector arrays measure the intensity of the light as a function of wavelength for each of the orders of diffraction that are detected. If curved gratings are used, the gratings may focus the light directly onto the photodetector arrays where the intensity is measured as a function of wavelength.

The incident light beam may be a nearly parallel beam of light or it may be a diverging beam of light from an aperture or from a small diameter focal spot on a sample that reflects the light collected for analysis by the photopolarimeter. Curved or flat gratings and additional focusing elements within the instrument may be employed to direct zero-order diffracted beams onto gratings or onto a reflecting device, and to focus the non-zero orders of diffraction onto the photodetector arrays.

Sensitivity to the Polarization State

The designs illustrated in FIGS. 1 to 4 present two-dimensional views which suggest that the gratings have a common plane of incidence. The two-dimensional views also suggest equal angles of incidence at all gratings. The planes and angles of incidence can differ at each grating without departing from the overall design. In the planar diffraction configuration, such differences in the plane and/or angles of incidence are required to obtain a complete polarimeter without placing polarizers in the paths of one or more diffracted beams; otherwise the determinant of the calibration matrix would be zero. Variations in the planes and angles of incidence at the various gratings can also be used to increase the sensitivity of the instrument to the polarization state of light, for both the planar and conical diffraction configurations.

It is known in the art that various means can be employed to enhance the sensitivity of the measured diffraction intensities to the polarization state of the light beam directed to the photopolarimeter. For example, the gratings may be oriented in the conical diffraction configuration to enhance sensitivity to the polarization state. Conical diffraction occurs when the lines of the grating are not perpendicular to the plane of incidence (see Azzam U.S. Pat. No. 5,337,146)

Sensitivity to the polarization state may also be enhanced by placing polarizers and/or retarders in the path of the diffracted light beams directed to one or more of the array detectors. Sheet polarizers or retarders may be used for this purpose, whose properties vary with wavelength. Therefore, the influence of the polarizers or retarders varies over the wavelength range of the instrument.

High sensitivity to the polarization state is desired over a broad bandwidth and is often required in applications, for example, in the use of the photopolarimeter in spectroscopic ellipsometry (SE). The ability to employ conical diffraction, to use polarizers and/or retarders in the optical path, and to vary the planes and angles of incidence in successive gratings, allows the design of the instrument to be optimized for high sensitivity to the polarization state of light over a broad bandwidth of light. These additional means to optimize the instrument are facilitated by the use of multiple gratings, with or without reflection of the zero order beam back onto the gratings.

Applications

Spectrophotopolarimeters according to the present invention have numerous applications, including in such fields as thin film deposition and measurement, measurements of the optical properties and thickness of multi-layer films.

Other modifications and alternative embodiments of the invention are contemplated which do not depart from the scope of the invention as defined by the foregoing teachings and appended claims. It is intended that the following claims cover all such modifications that fall within their scope.

We claim as our invention:

1. An instrument for measuring the complete polarization state of light over a spectral bandwidth, the instrument comprising:
   a source for producing an incident light beam (41);
   at least two diffraction gratings (42, 44, 46, 48), said gratings having a spatial frequency selected to produce a zero order diffracted beam and at least one non-zero order diffracted beam, the gratings positioned such that the first grating (42) intercepts the incident light beam (41) and subsequent gratings (44, 46, 48) intercept the zero order beam (43, 45, 47) transmitted by a grating to produce at the gratings (22, 44, 46, 48) at least four non-zero order diffracted beams (49, 50, 51, 52);
   photodetector arrays (57, 58, 59, 60) positioned to intercept at least four of the non-zero order diffracted beams; and
   means responsive to the photodetector arrays (57, 58, 59, 60) for calculating the polarization state of the incident light beam (41) over the wavelength range of the light.

2. The instrument of claim 1 in which the incident light beam has a bandwidth ranging from a minimum wavelength to a maximum wavelength of approximately 1.5 times the minimum wavelength.

3. The instrument of claim 2 further comprising polarizers located in light paths between the gratings and the photodetector arrays.

4. The instrument of claim 1 in which the incident light beam has a bandwidth ranging from a minimum wavelength to a maximum wavelength of approximately two times the minimum wavelength.

5. The instrument of claim 4 wherein the diffracted beams include first and second order diffracted beams, the instrument further comprising spectral filters that block transmission of light with a wavelength between the minimum wavelength and 1.5 times the minimum wavelength, the filters located in the light paths that transmit the second order diffraction spectra that lie in the wavelength range from 1.5 times to 2 times the minimum wavelength.

6. The instrument of claim 4 further comprising polarizers located in light paths between the gratings and the photodetectors.

7. The instrument of claim 1 in which the incident light beam has a bandwidth ranging from a minimum wavelength to a maximum wavelength of approximately four times the minimum wavelength.

8. The instrument of claim 7 wherein the diffracted beams include zero and first order diffracted beams, the instrument further comprising spectral filters that block transmission of light with a wavelength between the minimum wavelength and 2 times the minimum wavelength, the filters located in light paths that transmit the first order diffraction spectra that lie in the wavelength range from 2 times to 4 times the minimum wavelength.

9. The instrument of claim 1 wherein the plane of incidence differs at each successive grating.

10. An instrument for measuring the complete polarization state of light over a spectral bandwidth, the instrument comprising:
    a source for producing an incident light beam (71);
    one or more diffraction gratings (72, 74), said gratings having a spatial frequency selected to produce at least one diffracted order in addition to the zero-order diffracted beam and positioned such that the first grating

(72) intercepts the incident light beam (71) and subsequent gratings (74) intercept the zero order beam (73) transmitted by a grating;

a reflector (76) that returns the zero-order diffracted beam (76) from the last grating (74) to be incident on the last grating (74) from a direction that produces additional orders of diffraction from the grating (74) such that at least four non-zero orders of diffraction (79, 80, 81, 82) are produced at the gratings (72, 74);

photodetector arrays (87, 88, 89, 90) positioned to intercept at least four of the non-zero orders of diffraction from the gratings (72, 74); and means responsive to the photodetector arrays for calculating the polarization state of the incident light beam (71) over the wavelength range of the light.

11. The instrument of claim 10 in which the incident light beam has a bandwidth ranging from a minimum wavelength to a maximum wavelength of approximately 1.5 times the minimum wavelength.

12. The instrument of claim 11 further comprising polarizers located in the light paths between the gratings and the photodetector.

13. The instrument of claim 10 in which the incident light beam has a bandwidth ranging from a minimum wavelength to a maximum wavelength of approximately two times the minimum wavelength.

14. The instrument of claim 13 further comprising polarizers located in the light paths between the gratings and the photodetectors.

15. The instrument of claim 13 wherein the diffracted beams include first and second order diffracted beams, each beam having a spectra of wavelengths, the instrument further comprising spectral filters that block transmission of light with a wavelength between the minimum wavelength and 1.5 times the minimum wavelength, the filters located in the light paths that transmit the second order diffraction spectra that lie in the wavelength range from 1.5 times to 2 times the minimum wavelength.

16. The instrument of claim 10 in which the incident light beam has a bandwidth ranging from a minimum wavelength to a maximum wavelength of approximately 4 times the minimum wavelength.

17. The instrument of claim 16 wherein the diffracted beams include zero and first order diffracted beams, each beam having a spectra of wavelengths, the instrument further comprising spectral filters that block transmission of light with a wavelength between the minimum wavelength and 2 times the minimum wavelength, the filters located in the light paths that transmit the first-order diffraction spectra that lie in the wavelength range from 2 times to 4 times the minimum wavelength.

18. The instrument of claim 10 wherein the light source generates an incident light beam having a wavelength range of between 550 nm and 940 nm.

* * * * *